UNITED STATES PATENT OFFICE.

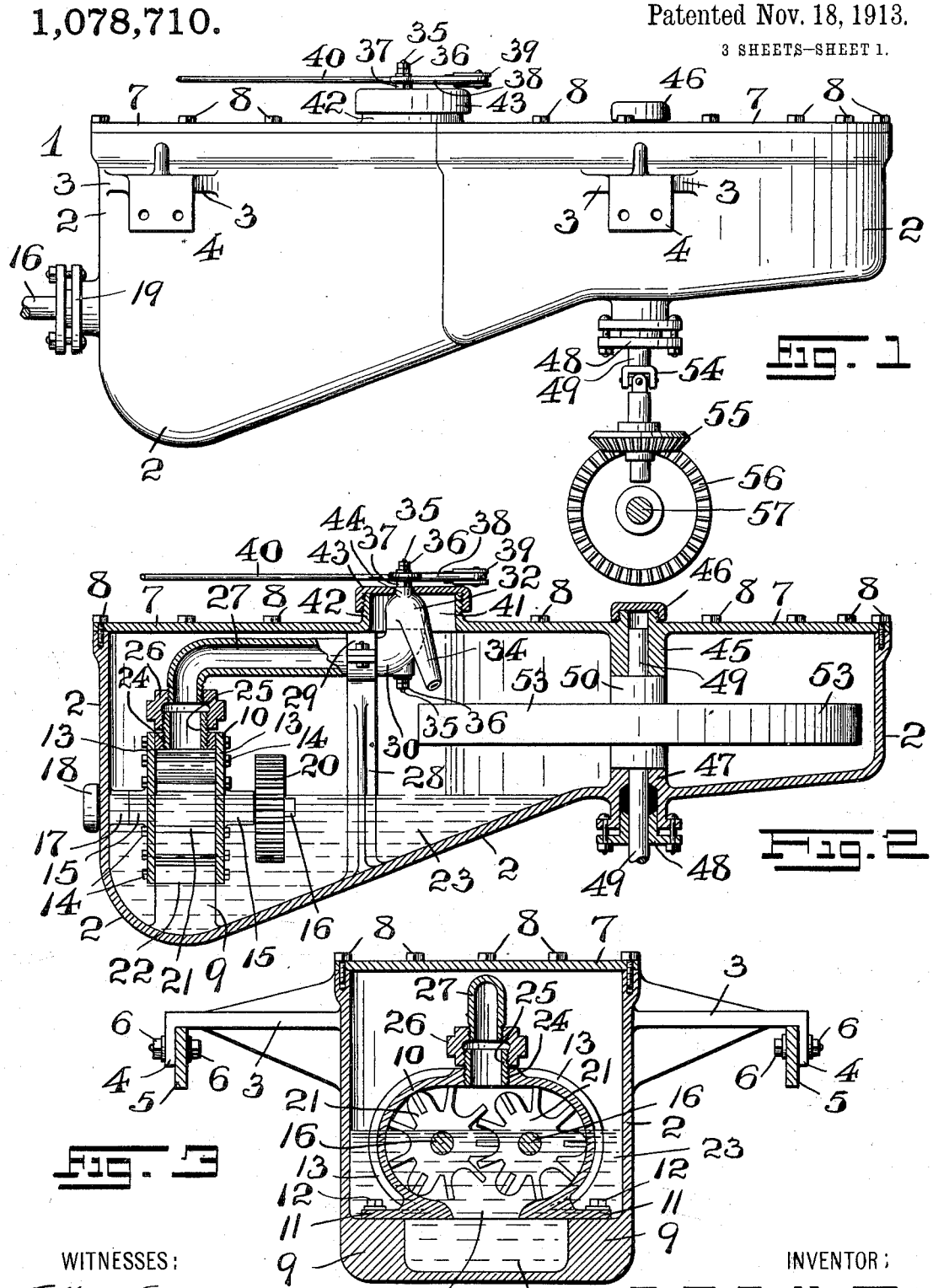

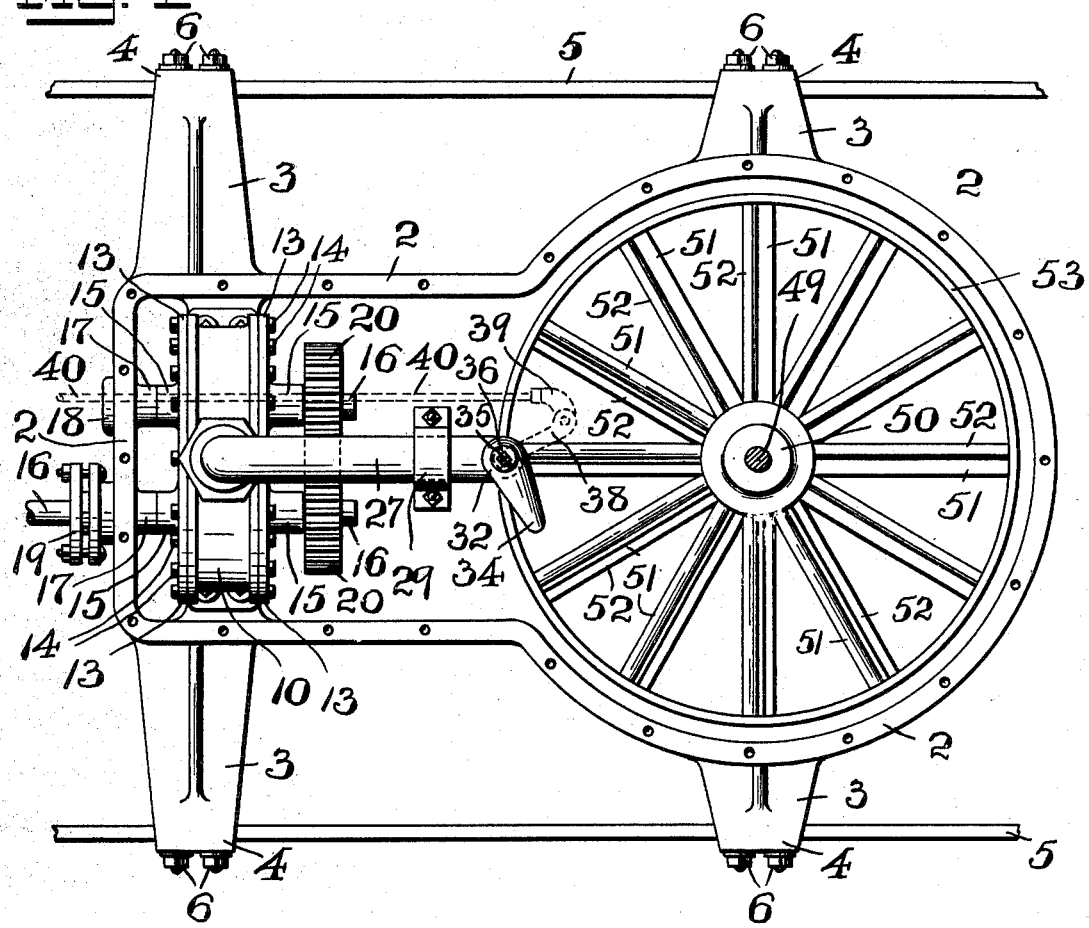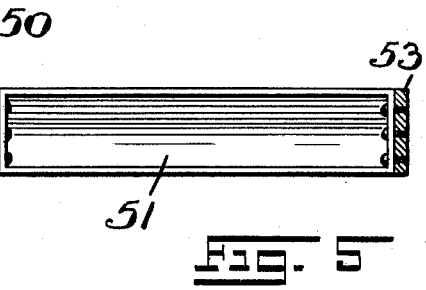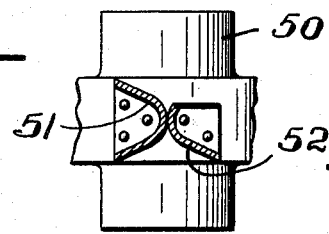

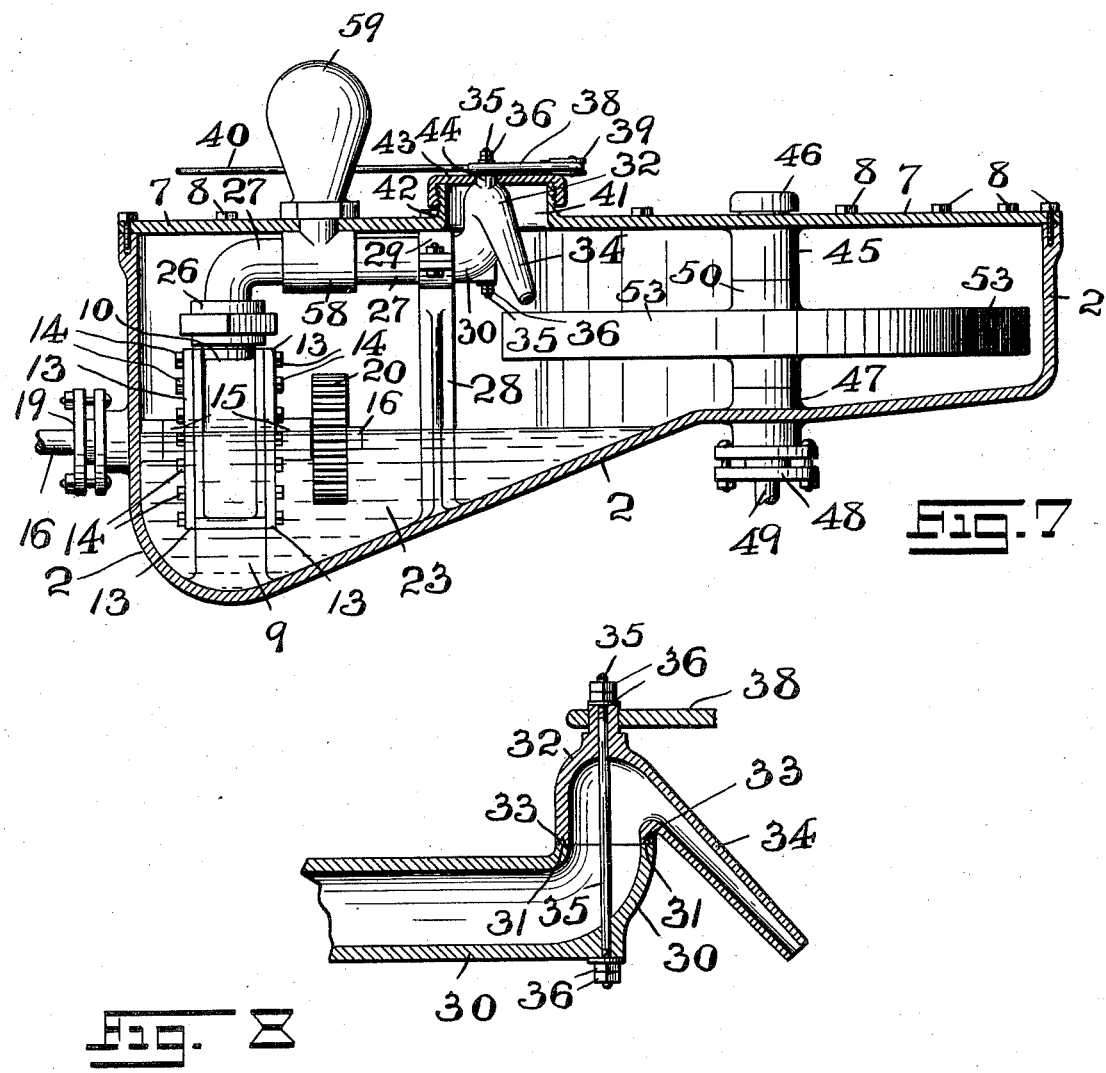

MAX W. WEIR, OF NEWARK, NEW JERSEY.

MEANS FOR TRANSMITTING POWER.

1,078,710.

Specification of Letters Patent.   Patented Nov. 18, 1913.

Application filed October 3, 1910. Serial No. 584,988.

*To all whom it may concern:*

Be it known that I, MAX W. WEIR, a citizen of the United States, residing at Newark, in the county of Essex and State of New Jersey, have invented certain new and useful Improvements in Means for Transmitting Power; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in a means for transmitting power generated by a prime-mover to the work to be performed; and, the invention relates, more particularly, to a novel construction of transmission which may be applied to various uses, but which is particularly adapted for use in self-propelled or motor-vehicles.

The present invention, therefore, has for its principal object to provide a novel and simply constructed transmission, which is flexible, very easy of operation and control, and which requires a minimum of attention from the operator.

A further object of this invention is to provide a novel form of transmission by means of which a maximum variation of speed may be obtained, in either the forward or reverse directions of motion.

A still further object of this invention is to provide a transmission by means of which variations of speed or power, stopping and reversing the direction of motion of the mechanism, are all controlled and operated by means of a single lever or operating means, thus greatly simplifying the work of the operator and permitting a high degree of control of the mechanism, with a minimum degree of attention upon the part of the operator. This result is particularly valuable when the present invention is applied to self-propelled or motor vehicles of the various kinds; and, the chance of accident in the operation of such vehicles is reduced to a minimum.

Other objects of the present invention not at this time more particularly mentioned will be clearly understood from the following detailed description of the same.

With the various objects of the present invention in view, the said invention consists, primarily, in the novel transmission device or mechanism hereinafter set forth; and, furthermore, this invention consists in the novel arrangements and combinations of the various devices and parts, as well as in the details of the construction of the same, all of which will be more fully described in the following specification, and then finally embodied in the clauses of the claims which are appended to and which form an essential part of this specification.

The invention is clearly illustrated in the accompanying drawings, in which:—

Figure 1 is a side elevation of the novel transmission device or mechanism, embodying the principles of the present invention, the same being inclosed in a casing adapted to be arranged upon the frame-work or chassis of a self-propelled or motor vehicle. Fig. 2 is a longitudinal vertical section of the same, illustrating more particularly the working parts or elements of the novel transmission device or mechanism and their operative relations to each other. Fig. 3 is a vertical cross-section of the same, illustrating more particularly the arrangement of a pump-element of the novel transmission device. Fig. 4 is a plan view of the said transmission device arranged in its casing and suspended upon the frame-work of the self-propelled or motor-vehicle, but the cover of the said casing being removed to show the interior working parts of the said transmission device. Fig. 5 is a cross-section of the liquid motor-wheel, removed from its relation with the other elements of the transmission device; and Fig. 6 is a detail cross-section through a set of the buckets arranged in or forming parts of said motor-wheel. Fig. 7 is a longitudinal vertical section of a slightly modified form of transmission device or mechanism embodying the principles of the present invention, the modifying feature whereof is the addition of an air-chamber operatively connected with the supply-pipe for conveying a liquid to the motor-wheel. Fig. 8 is a detail vertical section of the oscillating discharge nozzle which is operatively connected with the end of the said supply pipe.

Similar characters of reference are employed in all of the above described views, to indicate corresponding parts.

Referring now to the several figures of the drawings, the reference-character 1 indicates one complete form of my novel means of power transmission, the same being inclosed in a casing 2, when adapted to be applied more particularly for use in connection with a self-propelled or motor-vehicle. The said casing 2 is provided with suitably disposed outwardly extending arms or brackets 3 having upon their free ends suitably constructed downwardly extending members 4 adapted to be rigidly connected with the chassis or frame-work 5 of a self-propelled or motor-vehicle by means of the suitable bolts and nuts 6, or other fastening means. The said casing 2 is further provided with a cover-member 7 which is usually secured in place by means of the top-bolts 8. Arranged within the said casing 2, preferably near one end thereof, are a pair of pedestals 9, these said pedestals preferably forming an integral part of the said casing. Mounted upon said pedestals 9 is a rotary pump-casing 10 which is provided with outwardly extending members 11 which engage with the said pedestals 9 to support said casing 10, and which are secured in that relation by means of the top-bolts 12.

It will be clearly evident, that any form of pump may be employed as an element in the novel transmission device or mechanism set forth and described in this specification, such as a reciprocatory, rotary or other pump. For this reason a rotary-pump, hereinafter described, is simply selected as a preferable type for use in the present invention.

The rotary-pump, shown in the drawings, consists in the pump-casing 10 provided with side inclosing-plates 13 which are secured in place by means of top-bolts 14, the said plates being each provided with a pair of shaft-bearings 15 in which are mounted the shafts 16, substantially as illustrated. These shafts 16 project through a pair of bearings 17 with which the casing 2 is provided, one of said bearings being closed upon the exterior of the casing 2 by means of a cap 18, and the other bearing being formed or provided on the exterior of the casing 2 with a stuffing-box 19 through which one of said shafts 16 projects to enable the same to be coupled with a prime-mover, by means of which power is furnished to operate the said pump. The ends of the shafts 16, which project into the interior of the casing 2, are provided with interacting gears 20, whereby steadiness and perfect alinement of the shafts 16 are maintained while the pump is in operation. Arranged upon the shafts 16, within the pump-casing 10, are suitable gears 21 of any well-known construction, such as are ordinarily used in a rotary gear-pump.

The pump-casing 10 is provided at its bottom portion, between the pedestals 9, with an opening or suction-passage 22, through which the liquid 23 which is to be pumped, is taken or sucked into said pump. Arranged upon the upper side of the pump-casing 10 is a screw-threaded hole or opening 24 into which is screwed a screw-threaded nipple 25. Connected with said nipple, by means of a union 26, is a liquid conveying supply-pipe or conduit 27, said supply-pipe being rigidly supported in its operative relation with the other elements of the novel transmission device or mechanism by means of a standard 28 arranged within the interior of the casing 2 and provided with a bearing 29 adapted to receive and hold the said liquid-supply pipe or conduit 27 in its operative position. The said liquid supply-pipe terminates at its free end in an oscillating nozzle adapted to be oscillated or turned in any direction in a horizontal plane; and, the said nozzle may be of any desirable type or construction, the nozzle illustrated in the drawings, however, comprising a bottom-section 30 which may be integrally formed or may be otherwise connected with the end of the liquid supply-pipe. This said bottom-section 30 is stationary and is formed upon its upper edge or end with an annular or ring-shaped and preferably Λ-shaped projection or flange 31; an upper section 32, having an inner Λ-shaped depression 33 into which said Λ-shaped projection or flange 31 projects, being movably arranged above the said bottom-section 30, substantially in the manner illustrated in Fig. 8 of the drawings, so as to provide a liquid-tight joint between the two sections. This upper section 32 is provided with an outlet-member or spout 34 which is arranged at such an angle that the outflowing stream therefrom is directed at a tangent to the upper wall of the buckets of the liquid motor-wheel, to be hereinafter more particularly described.

The bottom-section 30 and the upper section 32 of this said nozzle are held together in their operative relation with each other, preferably by means of a centrally arranged bolt or stem 35 and the suitable lock-nuts and washers 36, substantially as illustrated more particularly in said Fig. 8 of the accompanying drawings.

The upper-section 32 of the nozzle is also provided upon its upper exterior portion with a square or angular boss or projection 37, upon which is fixed a lever or arm 38, the free end of which is pivotally connected with the forked-end 39 of a connecting-rod 40 which leads to a controlling lever, by means of which the nozzle may be made to turn or oscillate in any desired direction in a horizontal plane in order to direct the outflowing stream therefrom at the varying angle against the liquid-motor wheel, for the purpose of varying speed, or for reversing the direction of the motion of said wheel.

The cover-member 7 of the casing 2 may also be provided with an opening 41, surrounded by an upwardly extending and screw-threaded flange 42, adapted to form a turret in which the said nozzle may operate, the same being provided with a screw-threaded cover 43 adapted to close said opening 41, and said cover 43, however, being provided with an opening 44 through which may pass the boss or projection 37 to allow the same to be connected with the above described levers for operating the nozzle, as will be clearly understood.

The cover-member 7 of the casing 2 is further provided with a bearing 45, preferably forming an integral part thereof, that part of said bearing 45 which projects up the exterior of said cover-member being closed by a screw-threaded cap 46. Upon the bottom of the casing 2 is another bearing 47, which is placed opposite to and is in alinement with the said bearing 45 in the cover-member 7. This bearing 47 terminates upon the exterior side of the said casing in a stuffing box 48. Journaled within the said bearings 45 and 47 and projecting through the stuffing box 48 is a vertical shaft 49 upon which is mounted, between the said bearings, a motor-wheel comprising a hub 50 provided with radially disposed buckets. These buckets consist of the forward drive-buckets 51, which are U-shaped and are slightly widened or spread at the open end of the U, and the reverse-drive buckets 52. The reverse-drive buckets 52 have a portion of the upper wall or side thereof cutaway, as illustrated more particularly in Fig. 6 of the drawings, this construction being desirable to prevent the full force of the stream of liquid, when directed into the forward-drive buckets, from being deflected when said stream is directed at a point in the direction toward the hub 50. A band or rim 53 is secured upon the free ends of the said buckets 51 and 52 to give rigidity and strength to the motor-wheel. The lower end of the shaft 49, which projects through the stuffing-box 48, may be provided with a universal joint 54, and has secured thereon a bevel-gear 55 which meshes with a bevel gear 56 secured upon the main-driving shaft 57 of the self-propelled or motor-vehicle.

Referring now more particularly to Fig. 7 of the drawings, there is illustrated therein a slightly modified construction of transmission device embodying the principles of the present invention. In this construction, there is shown connected with the liquid conveying or supply-pipe or conduit 27, a T-fitting 58 which projects through a suitable opening in the cover-member 7. Secured to this fitting 58 is any well-known form of air-chamber 59 which will compensate by its action in connection with the liquid conveying or supply-pipe or conduit 27 for any fluctuation in the flowing stream of liquid as it is delivered from the pump, and thereby causes a continuous and uniform stream of the liquid to flow through the nozzle against the liquid motor-wheel.

The novel transmission device or mechanism as described in the above specification, briefly operates as follows:

A suitable liquid, such as a non-volatile oil, or the like, is placed in the casing; and, owing to the construction thereof, with the pump arranged at a lower level than the liquid-motor wheel, always presenting such liquid at the intake or suction passage of the pump-casing.

The pump is operated by a suitable mover, such as a gas-engine, and when in operation forces the liquid into and through the liquid-supply pipe until it is discharged at the nozzle, at which point the said discharged or outflowing stream is directed into the forward drive-buckets of the liquid-motor wheel causing the latter to be revolved, and through the above described arrangement of the connecting-elements driving the rear or main driving shaft or axle 57 of the vehicle. When great power is desired with less speed, the nozzle is turned at such an angle so that the stream of liquid is directed near the outer end of the bucket, but for speed after the momentum of the vehicle is gained, the nozzle is turned at an angle so as to direct the stream of liquid near the inner end of the bucket; that is, toward the hub of the wheel. To reverse the direction of the movement of the liquid motor-wheel, the nozzle is turned around until the stream of liquid is directed into the reverse drive-buckets, whereupon the liquid motor-wheel moves in the opposite direction, as will be clearly evident. All these above described operations may be accomplished by the manipulation of a single lever designed to control the oscillation of the nozzle. It will also be evident, that, by varying the angle of the stream of liquid toward the liquid motor wheel, that is, by shifting the stream from the outer toward the inner end of the buckets, great variations of speed and power may be effectively obtained.

I claim:—

1. In a means for transmitting power, the combination with a casing adapted to contain a liquid, said casing being provided with a cover-member, a bearing arranged in said cover-member, and a bearing arranged in the bottom of said casing, said bearing being provided on the exterior side of the casing with a stuffing-box, a shaft journaled in said bearings and projecting through said stuffing-box, a liquid motor-wheel mounted on said shaft within the casing, said liquid motor-wheel comprising a hub, radially arranged drive-buckets, a band or rim connecting the free ends of said buckets, a pump mounted on pedestals arranged within said casing and adapted to be supplied by said body of liquid, and means connected with said pump for directing a stream of liquid discharged thereby against the said liquid motor-wheel to rotate the same in a forward or reverse direction, substantially as and for the purposes set forth.

2. In a means for transmitting power, the combination with a casing adapted to contain a liquid, said casing being provided with a cover-member, a bearing arranged in said cover-member, and a bearing arranged in the bottom of said casing, said bearing being provided on the exterior side of the casing with a stuffing-box, a shaft journaled in said bearings and projecting through said stuffing-box, a liquid motor-wheel mounted on said shaft within the casing, said liquid motor-wheel comprising a hub, radially arranged drive-buckets, a band or rim connecting the free ends of said buckets, a pump mounted on pedestals arranged within said casing and adapted to be supplied by said body of liquid, and means connected with said pump for directing a stream of liquid discharged thereby against the said liquid motor-wheel to rotate the same in a forward or reverse direction, said means comprising a liquid supply-pipe or conduit connected with the outlet of said pump, and an oscillating nozzle secured upon the free end of said liquid-supply pipe or conduit, adapted to direct the stream of liquid flowing therefrom against the said liquid motor-wheel, substantially as and for the purposes set forth.

3. In a means for transmitting power, the combination with a casing adapted to contain a liquid, said casing being provided with a cover-member, a bearing arranged in said cover-member, and a bearing arranged in the bottom of said casing, said bearing being provided on the exterior side of the casing with a stuffing-box, a shaft journaled in said bearings and projecting through said stuffing-box, a liquid motor-wheel mounted on said shaft within the casing, said liquid motor-wheel comprising a hub, radially arranged drive-buckets, a band or rim connecting the free ends of said buckets, a pump mounted on pedestals arranged within said casing and adapted to be supplied by said body of liquid, and means connected with said pump for directing a stream of liquid discharged thereby against the said liquid motor-wheel to rotate the same in a forward or reverse direction, said means comprising a liquid supply pipe or conduit connected with the outlet of said pump, and an oscillating nozzle secured upon the free end of said liquid-supply pipe or conduit, adapted to direct the stream of liquid flowing therefrom against the said liquid motor-wheel, and means for oscillating or turning said oscillating nozzle, substantially as and for the purposes set forth.

4. In a means for transmitting power, the combination with a casing adapted to contain a liquid, said casing being provided with a cover-member, a bearing arranged in said cover-member, and a bearing arranged in the bottom of said casing, said bearing being provided on the exterior side of the casing with a stuffing-box, a shaft journaled in said bearings and projecting through said stuffing-box, a liquid motor-wheel mounted on said shaft within the casing, said liquid motor-wheel comprising a hub, radially arranged drive-buckets, a band or rim connecting the free ends of said buckets, a pump mounted on pedestals arranged within said casing and adapted to be supplied by said body of liquid, and means connected with said pump for directing a stream of liquid discharged thereby against the said liquid motor-wheel to rotate the same in a forward or reverse direction, said means comprising a liquid supply pipe or conduit connected with the outlet of said pump, and an oscillating nozzle secured upon the free end of said liquid-supply pipe or conduit, adapted to direct the stream of liquid flowing therefrom against the said liquid motor-wheel, and means for oscillating or turning said oscillating nozzle, comprising a lower or bottom nozzle-section and an upper nozzle-section, said upper nozzle-section being provided with an outlet-member movably arranged upon said lower or bottom section, a bolt and lock-nuts adapted to hold the two nozzle-sections together, and an upwardly extending boss arranged upon the upper portion of the upper nozzle-section, and a lever connected with said boss adapted to turn or oscillate the upper nozzle-section upon the lower or bottom nozzle-section, substantially as and for the purposes set forth.

5. In a means for transmitting power, the combination with a casing adapted to contain a liquid, said casing being provided with a cover-member, a bearing arranged in said cover-member, and a bearing arranged in the bottom of said casing, said bearing being provided on the exterior side of the casing with a stuffing-box, a shaft journaled in said bearings and projecting through said stuffing-box, a liquid motor-wheel mounted on said shaft within the casing, said liquid motor-wheel comprising a hub, radially arranged drive-buckets, a band or rim connecting the free ends of said buckets, a pump mounted on pedestals arranged within said casing and adapted to be supplied by said body of liquid, and means connected with said pump for directing a stream of liquid discharged thereby against the said liquid motor-wheel to rotate the same in a forward or reverse direction, said means comprising a liquid supply pipe connected with the outlet of said pump, an air-chamber and an oscillating nozzle secured upon the free end of said pipe, adapted to direct the stream of liquid flowing therethrough against the said liquid motor-wheel, substantially as and for the purposes set forth.

6. In a means for transmitting power, the combination with a casing adapted to contain a liquid, said casing being provided with a cover-member, a bearing arranged in said cover-member, and a bearing arranged in the bottom of said casing, said bearing being provided on the exterior side of the casing with a stuffing-box, a shaft journaled in said bearings and projecting through said stuffing-box, a liquid motor-wheel mounted on said shaft within the casing, said liquid motor-wheel comprising a hub, radially arranged drive-buckets, a band or rim connecting the free ends of said buckets, a pump mounted on pedestals arranged within said casing and adapted to be supplied by said body of liquid, and means connected with said pump for directing a stream of liquid discharged thereby against the said liquid motor-wheel to rotate the same in a forward or reverse direction, said means comprising a liquid supply pipe connected with the outlet of said pump, an air-chamber and an oscillating nozzle secured upon the free end of said pipe, adapted to direct the stream of liquid flowing therethrough against the said liquid motor-wheel, and means for oscillating or turning said oscillating nozzle, substantially as and for the purposes set forth.

7. In a means for transmitting power, the combination with a casing adapted to contain a liquid, said casing being provided with a cover-member, a bearing arranged in said cover-member, and a bearing arranged in the bottom of said casing, said bearing being provided on the exterior side of the casing with a stuffing-box, a shaft journaled in said bearings and projecting through said stuffing-box, a liquid motor-wheel mounted on said shaft within the casing, said liquid motor-wheel comprising a hub, radially arranged drive-buckets, a band or rim connecting the free ends of said buckets, a pump mounted on pedestals arranged within said casing and adapted to be supplied by said body of liquid, and means connected with said pump for directing a stream of liquid discharged thereby against the said liquid motor-wheel to rotate the same in a forward or reverse direction, said means comprising a liquid supply pipe connected with the outlet of said pump, an air-chamber and an oscillating nozzle secured upon the free end of said pipe, adapted to direct the stream of liquid flowing therethrough against the said liquid motor-wheel, and means for oscillating or turning said oscillating nozzle, comprising a lower or bottom nozzle-section and an upper nozzle-section, said upper nozzle-section being provided with an outlet-member movably arranged upon said lower or bottom section, a bolt and lock-nuts adapted to hold the two nozzle-sections together, and an upwardly extending boss arranged upon the upper portion of the upper nozzle-section, and a lever connected with said boss adapted to turn or oscillate the upper nozzle-section upon the lower or bottom nozzle-section, substantially as and for the purposes set forth.

8. In a transmission, the combination with a casing and cover-member therefor, said casing being adapted to contain a body of liquid, a rotary-pump mounted on pedestals within said casing, a stuffing-box arranged in said casing through which projects the driving shaft of said rotary-pump, a liquid supply-pipe connected with said pump, an oscillating nozzle arranged upon the free end of said liquid supply-pipe, bearings arranged upon said casing and said cover-member, a shaft journaled in said bearings, a stuffing box upon the exterior of said casing through which projects said shaft, a liquid motor-wheel mounted on said shaft within the casing, forward drive-buckets and reverse drive-buckets arranged upon the hub of said liquid motor-wheel, and a band or rim connecting said buckets at their outer or free ends, substantially as and for the purposes set forth.

9. In a transmission, the combination with a casing and cover-member therefor, said casing being adapted to contain a body of liquid, a rotary-pump mounted on pedestals within said casing, a stuffing-box arranged in said casing through which projects the driving shaft of said rotary-pump, a liquid supply-pipe connected with said pump, an oscillating nozzle arranged upon the free end of said liquid supply-pipe, bearings arranged upon said casing and said cover-member, a shaft journaled in said bearings, a stuffing box upon the exterior of said casing through which projects said shaft, a liquid motor-wheel mounted on said shaft within the casing, forward drive-buckets and reverse drive-buckets arranged upon the hub of said liquid motor-wheel, and a band or rim connecting said buckets at their outer or free-ends, and an air-chamber connected with the said liquid supply pipe or
5 conduit, substantially as and for the purposes set forth.

In testimony, that I claim the invention set forth above I have hereunto set my hand this 29th day of September, 1910.

MAX W. WEIR.

Witnesses:
FREDK. C. FRAENTZEL,
FREDK. H. W. FRAENTZEL.